United States Patent [19]
Rennie et al.

[11] 3,914,267

[45] Oct. 21, 1975

[54] PRODUCTION OF ISOCYANATES BY THERMAL DECOMPOSITION OF AROMATIC HYDROXAMIC ACID HALIDES

[75] Inventors: Robert Allan Campbell Rennie; John Crosby; Robert Michael Paton, all of Runcorn, England

[73] Assignee: Imperial Chemical Industries Limited, London, England

[22] Filed: Nov. 6, 1972

[21] Appl. No.: 303,815

[30] Foreign Application Priority Data
Nov. 8, 1971 United Kingdom............... 51716/71

[52] U.S. Cl. ..... 260/453 P; 204/158 R; 260/307 G; 260/307 H; 260/465 R; 260/465 H; 260/543 A; 260/566 A
[51] Int. Cl.² ....................................... C07C 118/00
[58] Field of Search ......... 260/453 P, 566 A, 543 A

[56] References Cited
UNITED STATES PATENTS

| | | | |
|---|---|---|---|
| 2,394,597 | 2/1946 | Dickey et al....................... | 260/453 |
| 3,076,026 | 1/1963 | White ............................. | 260/566 X |
| 3,507,900 | 4/1970 | Burk, Jr. et al..................... | 260/453 |

OTHER PUBLICATIONS

Chiang: J. Org. Chem., Vol. 36, No. 15, pp. 2155–2158, (1971).

*Primary Examiner*—Lewis Gotts
*Assistant Examiner*—Dolph H. Torrence
*Attorney, Agent, or Firm*—Cushman, Darby & Cushman

[57] ABSTRACT

Aromatic isocyanates are prepared by thermal decomposition of an aromatic hydroxamic acid halide wherein there are at least two hydroxamic acid halide groups attached to the same or different aromatic rings. The aromatic hydroxamic acid halide may be prepared by reacting nitrosyl halide with an aromatic compound containing one or more methyl or halomethyl groups attached to an aromatic ring.

21 Claims, 6 Drawing Figures

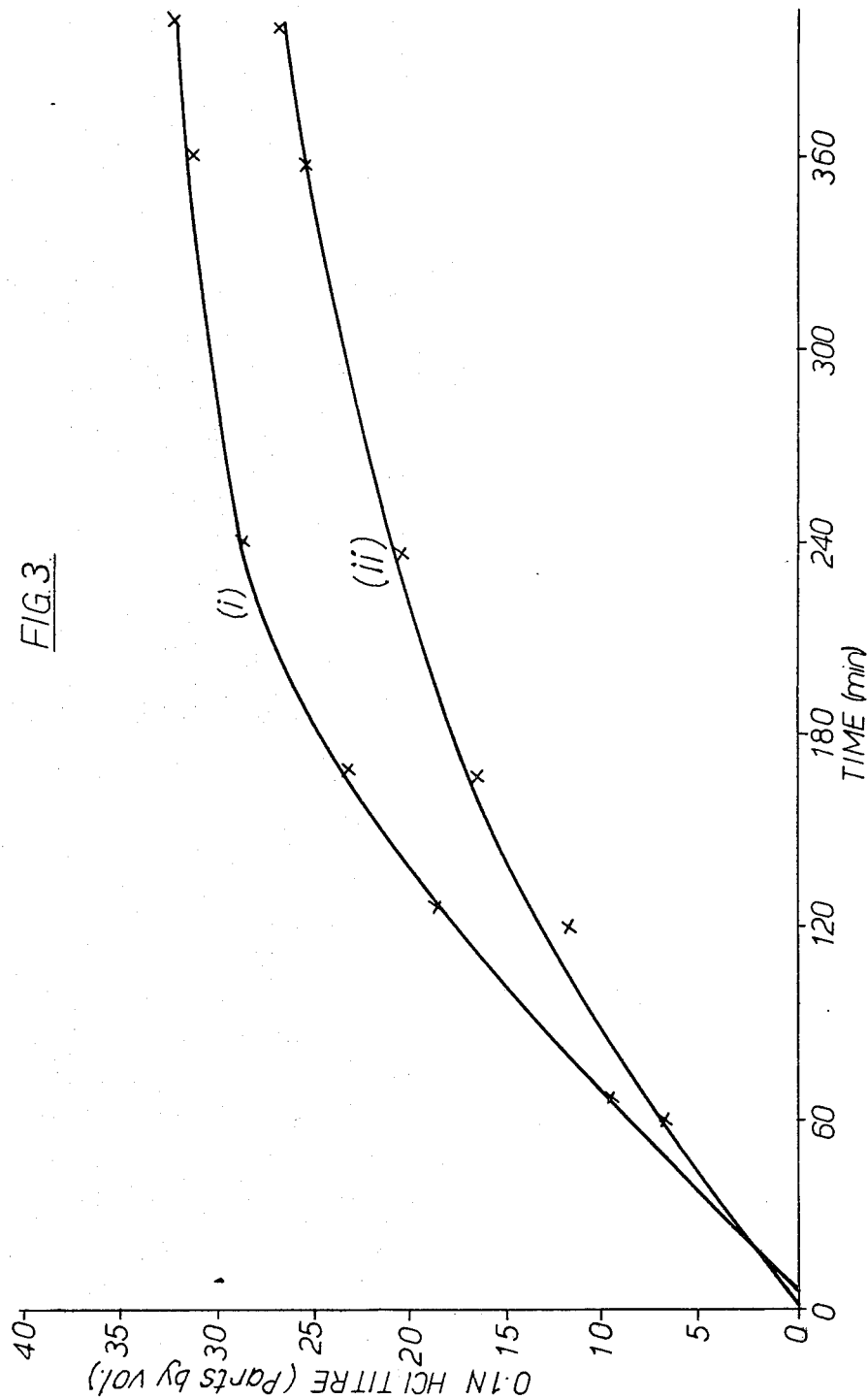

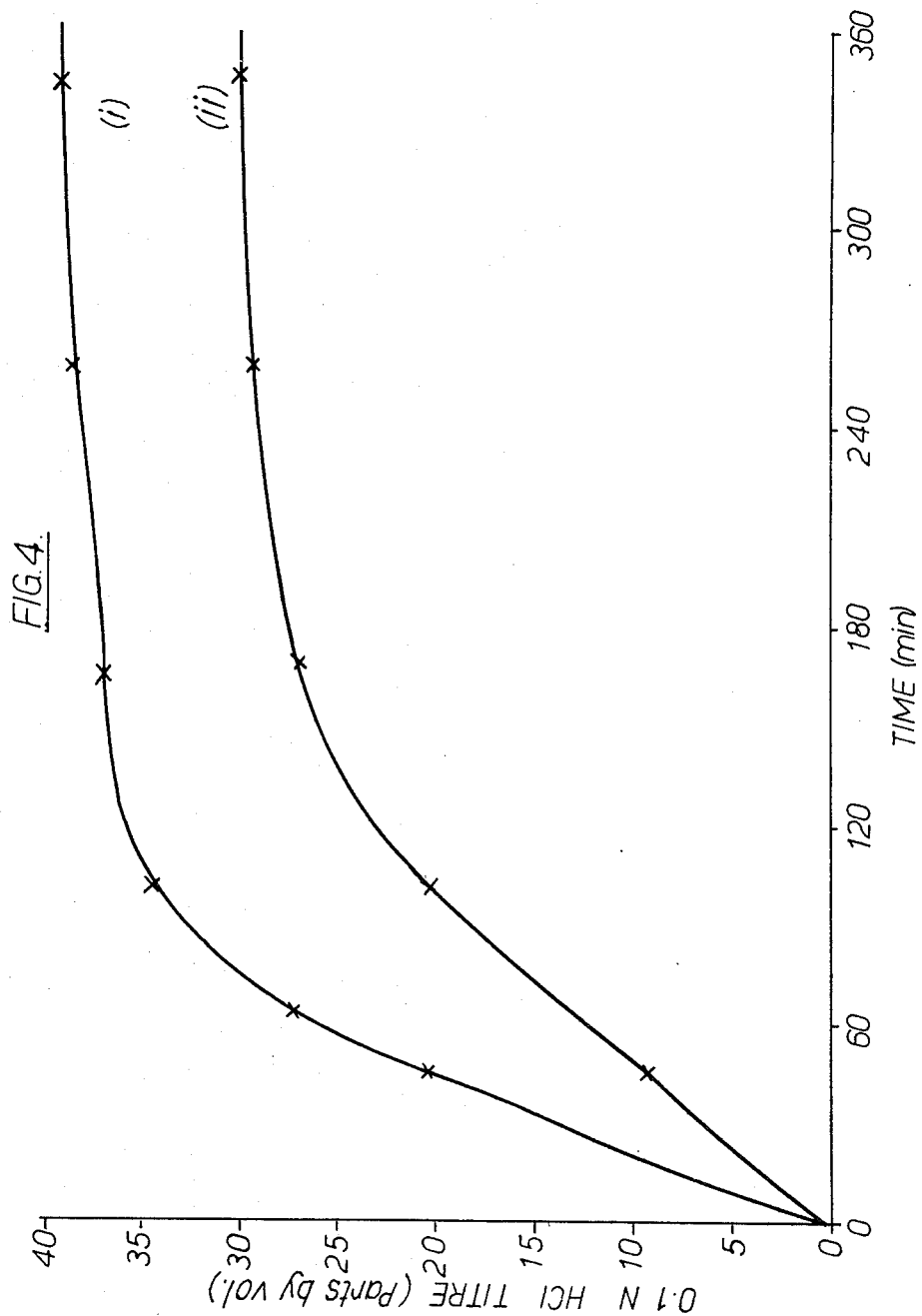

PRODUCTION OF ISOCYANATES BY THERMAL DECOMPOSITION OF AROMATIC HYDROXAMIC ACID HALIDES

This invention relates to a process for the preparation of organic isocyanates.

According to one aspect of the present invention, we provide a process for the production of aromatic isocyanates which comprises the steps of reacting a nitrosyl halide with an aromatic compound containing one of more methyl or halomethyl groups attached to an aromatic ring to form an aromatic compound containing one or more hydroxamic acid halide groups attached to an aromatic ring, and then dehydrohalogenating the hydroxamic acid halide.

According to this aspect of the invention, the aromatic compound contains one or more methyl or halomethyl groups attached to an aromatic ring, the methyl groups are converted to oximino groups by reaction with a nitrosyl halide, and the oximino groups are halogenated to hydroxamic acid halide groups (1-halooximino groups). Surprisingly, derivatives containing hydroxamic acid chloride groups may be produced in a single process step from the aromatic compound.

Preferably, the nitrosyl halide is nitrosyl chloride.

The aromatic compound preferably bears one or two methyl and/or halomethyl groups. Preferably there are two (halo) methyl groups, which may be attached to the same or different aromatic rings.

The aromatic compound may be an aromatic hydrocarbon or ether. Preferably, the compound includes at least two benzene rings. These may be fused together, as in α- or β-methylnaphthalene and the dimethylnaphalene isomers. Preferably, however, the benzene rings are joined one to another by a direct link, as in the biphenyl derivatives, or by a divalent or polyvalent atom or group. Suitable divalent or polyvalent atoms or groups include oxygen or sulphur, as in the aromatic ethers or the thio-ethers; alkylene; dioxyalkyl, —O(CH$_2$)$_n$ O—; —SO$_2$—, as in the aromatic sulphones; or phosphate or phosphite. The essential feature of such linking atoms or groups is that they are not disrupted during the reaction with nitrosyl halide nor during dehydrohalogenation.

As examples of aromatic compounds suitable for use according to this aspect of the invention may be mentioned toluene; o-, m- and p- xylene; 2-, 3- or 4- methyl diphenyl ether; 4,4'- dimethyl diphenyl ether and its positional isomers (including compounds in which the two methyl groups are attached to the same or to different benzene rings); α or β-methylnaphthalene; positional isomers of dimethyl naphthalene; 2-, 3- or 4- methyl biphenyl; 4,4'-dimethyl biphenyl and its positional isomers (including compounds where the two methyl groups are attached to the same or to different benzene rings); 2-, 3- or 4- methyl diphenylmethane; 4-4' dimethyl diphenylmethane and its positional isomers as above; the isomeric di-tolyl sulphones; and the tris-tolyl phosphates, together with the corresponding halomethyl compounds.

The reaction of the nitrosyl halide with the aromatic compound is preferably initiated photochemically. In this process, a mixture of the aromatic compound with the nitrosyl halide is irradiated with visible or ultraviolet light of a wavelength capable of being absorbed by one or both of the reactants. Optionally, a solvent may be used which is inert to the nitrosyl halide and which does not undergo photochemical reactions when irradiated by light of the wavelength to be used. Suitable solvents may include benzene, and chlorinated solvents, for example carbon tetrachloride. Preferably, the reaction is performed in the presence of a stoichiometric excess of nitrosyl halide at reflux temperature. Again optionally, the nitrosyl halide may be formed in situ by addition of a mixture of nitric oxide and the corresponding halogen to the aromatic compound.

Where the aromatic hydrocarbon is toluene and the nitrosyl halide is nitrosyl chloride, the oximination reaction may be represented as:

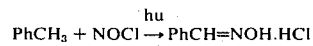

$$PhCH_3 + NOCl \xrightarrow{h\nu} PhCH=NOH.HCl$$

(where Ph = phenyl), the product being benzaldoxime hydrochloride. It may be advantageous to carry out this stage of the process of the invention in the presence of anhydrous hydrogen chloride, or another Lewis acid, for example zinc chloride or aluminium chloride, as this may catalyse the formation of the oxime from the nitroso compound

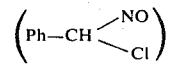

which, without prejudice to the invention, is believed to be an intermediate. The oxime hydrochloride produced in this reaction may be converted to the oxime by base, if desired.

It is known to chlorinate oximino groups, by passing gaseous chlorine through a solution of the oxime, to produce the corresponding hydroxamic acid chloride compound. For benzaldoxime, for example, this reaction may be represented as:

$$Ph-CH=NOH + Cl_2 \rightarrow PhCCl=NOH + HCl$$

Surprisingly, we have discovered that the two stages of nitrosyl halide addition to form the oxime and halogenation may occur in a single step. Nitrosyl halide, particularly nitrosyl chloride, itself functions as a halogenating agent, so that the oxime or oxime hydrohalide initially produced is wholly or partially halogenated to the hydroxamic acid halide without the necessity for separate addition of halogen.

If the aromatic compound has more than one methyl or halomethyl group, a compound having more than one hydroxamic acid chloride group may be produced. For example, benzene-1,4-bis(hydroxamic acid chloride),

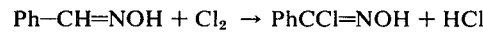

may be prepared from p-xylene.

The aromatic compound used in the process of the invention may be prepared from an unsubstituted aromatic compound by insertion of one or more halomethyl groups onto a benzene ring by the known reaction of halomethylation. The resulting compound then contains one or more halomethyl groups and may be reacted with a nitrosyl halide as described above with the production of the derivative containing one or more hydroxamic acid halide groups attached to a benzene ring. Suitable aromatic hydrocarbons or ethers for use according to this aspect of the invention include benzene, biphenyl, naphthalene and diphenyl ether, in addition to the compounds listed above which contain one or more methyl groups.

Halomethylation, for example chloromethylation, reactions, in which an aromatic compound is reacted with formaldehyde or a precursor thereof and hydrogen halide in a suitable solvent, and optionally in the presence of a Lewis acid catalyst, are well known. Thus, benzene may be converted to benzyl chloride in a reaction which may be represented as:

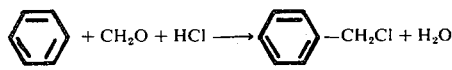

and the reaction may proceed further to give compounds such as 1,4-bis(chloromethyl) benzene (I) and 4,4'-bis(chloromethyl) diphenylmethane (II).

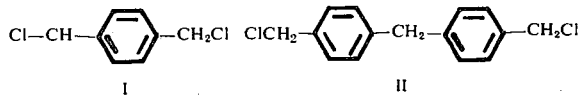

The chloromethylated product is then reacted with a nitrosyl halide as described above, in order to give a compound containing hydroxamic acid chloride groups according to the reaction:

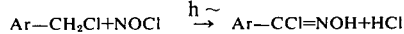

where Ar is an aromatic residue.

The starting material used for halomethylation may also contain methyl groups, which would themselves react to give oximino groups and possibly hydroxamic acid chloride groups during the photochemical reaction with nitrosyl chloride. For example, starting with toluene, the following reactions could occur:

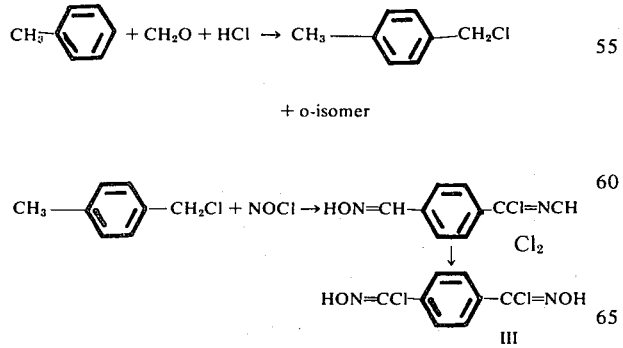

Preferably, the aromatic compound contains at least one halomethyl group attached to an aromatic ring, particularly two halomethyl groups. It is preferred that all the halomethyl groups are chloromethyl groups, and all the halogen atoms associated with the aromatic compound are chlorine atoms.

Halomethyl groups may be introduced into an unsubstituted aromatic compound by halomethylation, as described above.

Alternatively, an aromatic compound containing one or more methyl groups attached to an aromatic ring may be halogenated, for example chlorinated, in order to convert the methyl groups to halomethyl groups, and the resultant halomethyl compound reacted with nitrosyl halide as described above. Thus, for example, toluene may be chlorinated to benzyl chloride and subsequently reacted with nitrosyl chloride to give benzohydroxamic acid chloride:

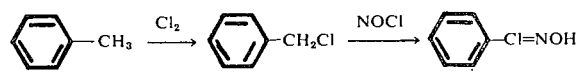

and p- xylene may be converted similarly to 1,4-bis(chloromethyl) benzene (I) and benzene -1,4-bis(-hydroxamic acid chloride) (III)

The hydroxamic acid halide compound is converted to an isocyanate by a dehydrohalogenation reaction. The hydroxamic acid halide is made to lose hydrogen halide, with consequential rearrangement, to form an aromatic compound having one or more isocyanate groups attached to an aromatic ring. Conveniently, dehydrohalogenation is effected by a thermal decomposition, preferably by heating a solution of the hydroxamic acid halide in an appropriate solvent. Convenient solvents are the polar aromatic solvents, particularly the halobenzenes, for example dichlorobenzene.

Preferred temperatures for the thermal decomposition of the hydroxamic acid alides are from 100° to 250°C, more preferably 150° to 200°C, and particularly 180° to 200°C. In general, the higher temperatures are preferred, since, at lower temperatures, reaction may be prolonged and the incidence of side reactions may thus increase.

It may be desirable to perform the thermal decomposition at reduced pressure, for example 10–12mm Hg, but it is convenient to operate at substantially atmospheric pressure.

The overall process of the invention, using toluene as starting material and nitrosyl chloride as reagent may be exemplified by:

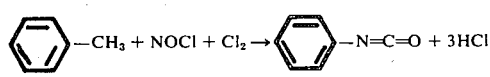

using p-xylene, as:

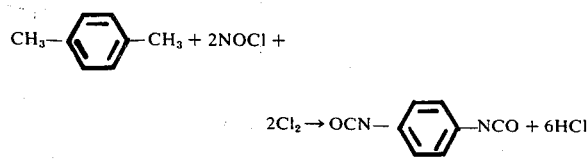

and using benzene and chloromethylation, as:

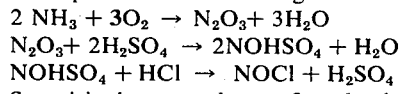

In each case, hydrogen chloride is obtained as a by-product. This may be recovered, and used directly or indirectly in the earlier stages of the process. Thus, if a chloromethylation step is used, the hydrogen chloride may be utilised directly in this step. Alternatively, the hydrogen chloride may be used to generate chlorine by electrolysis, or to prepare nitrosyl chloride from nitrososulphuric acid according to the scheme:

$2 NH_3 + 3O_2 \rightarrow N_2O_3 + 3H_2O$
$N_2O_3 + 2H_2SO_4 \rightarrow 2NOHSO_4 + H_2O$
$NOHSO_4 + HCl \rightarrow NOCl + H_2SO_4$ Surprisingly, we have found that dehydrohalogenation of hydroxamic acid halide compounds proceeds particularly readily when there are at least two hydroxamic acid halide groups bonded to an aromatic ring.

Thus, according to another aspect of the present invention, we provide a process for the production of aromatic polyfunctional isocyanates which comprises dehydrohalogenation of an aromatic compound containing at least two hydroxamic acid halide groups attached to the same or different aromatic rings.

By "polyfunctional isocyanate", we means an isocyanate having two or more isocyanate groups attached to the same or different aromatic rings.

Preferably the aromatic compound contains only two hydroxamic acid halide groups, particularly hydroxamic acid chloride groups.

As described above, the aromatic hydroxamic acid halide may be dehydrohalogenated by thermal decomposition, preferably by heating the compound in solution in an appropriate solvent, for example a polar aromatic solvent.

The hydroxamic acid halide compound may conveniently be prepared by reaction of a nitrosyl halide, particularly nitrosyl chloride, with an aromatic compound containing two or more methyl or halomethyl groups attached to the same or different aromatic rings, as described above.

The invention is now illustrated by the following Examples, in which parts by weight and parts by volume bear the same relationship as do kg and dm³.

EXAMPLE 1

Benzohydroxamic acid chloride from toluene

A 2% by weight solution of nitrosyl chloride in toluene was placed in a flask and cooled by means of ice water circulating through a coil immersed in the solution. The flask was externally illuminated by a 1 kw quartz - iodine lamp at a distance of 30 cm, until the initial red-brown colour of the solution faded to a pale yellow. Fine white crystals were precipitated during the later stages of the irradiation, and were collected by filtration and shown to be benzaldoxime hydrochloride,

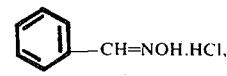

by conversion to β-benzaldoxime, melting point 125°C (literature 130°C). The identification was confirmed by chemical analysis.

The filtrate was concentrated by evaporation under reduced pressure below 30°C to give a pale yellow oil, shown to contain α-chlorobenzaldoxime (benzohydroxamic acid chloride

This was confirmed by the production of benzonitrile oxide characterised by its infrared spectrum, on treatment with aqueous base.

EXAMPLE 2

Chlorination of benzaldoxime hydrochloride

A saturated solution of benzaldoxime hydrochloride in chloroform was treated with an excess of chlorine gas at −10° to 20°C, and allowed to stand at −10° to 20°C, while the progress of the reaction was followed by infra-red and nuclear magnetic reconance spectroscopy.

When no further conversion to hydroxamic acid chloride was apparent, the excess chlorine was removed by passing a stream of dry nitrogen through the solution. The solvent was then removed under reduced pressure below 30°C to give a crystalline mass which, after recrystallisation from 8 N aqueous hydrochloric acid, had a melting point of 47°C. Literature values for benzohydroxamic acid chloride are 45°–50°C.

EXAMPLE 3

Benzohydroxamic chloride from benzyl chloride

A solution containing 2% by weight nitrosyl chloride and 5% by weight benzyl chloride in benzene was irradiated as described in Example 1. On evaporation of the solvent under reduced pressure below 30°C, an oil was obtained which was shown by infrared and NMR spectroscopy to contain benzohydroxamic acid chloride.

EXAMPLE 4

Phenyl isocyanate from benzohydroxamic acid chloride

A melt of benzohydroxamic acid chloride was fed to the inner heated column of a falling film evaporator, which was maintained at a temperature of 175°–180°C, and a pressure of 10 mm of mercury. The product collected from the cool column was shown by infrared spectroscopy and by comparison of gas-liquid chromatography retention times with a authentic sample to contain phenyl isocyanate. This was confirmed by reac-

EXAMPLE 5

Benzene-1,3-bis(hydroxamic acid chloride) from m-xylene

A solution of 2% by weight nitrosyl chloride in m-xylene was irradiated as described in Example 1. From the reaction product was isolated m-methyl benzaldoxime hydrochloride and an oil shown by spectroscopic methods to contain benzene - 1,3-bis(hydroxamic acid chloride).

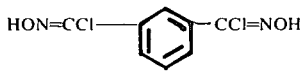

EXAMPLE 6 m-Phenylene di-isocyanate from benzene-1,3-bis(hydroxamic chloride)

Crude benzene -1,3bis(hydroxamic acid chloride) was reacted as described in Example 4 to give a product shown by spectroscopic methods to contain benzene - 1,3 - diisocyanate (m-phenylene diisocyanate).

EXAMPLE 7

Photochloronitrosation of Toluene (Note. In this Example, quantities of products are quoted as moles per litre of the original reaction mixture).

A solution of nitrosyl chloride in toluene (0.26 M) was placed in a round-bottomed flask. The mixture was irradiated at room temperature with 8 × 20 watt white fluorescent lamps until the colour of the solution had faded to a pale yellow. Unreacted excess toluene and unreacted nitrosyl chloride were removed by evaporation at room temperature under reduced pressure. Quantitative gas-liquid chromatographic analysis of the crude reaction product showed it to contain benzaldehyde (0.0485 moles per litre) and benzyl chloride (0.0115 moles per litre).

The crude product was added to anhydrous diethyl ether and unsaturated with anyhdrous hydrogen chloride, to give a precipitate of benzaldoxime hydrochloride (0.0225 moles per litre), which was identified by mixed melting point and infra-red comparison with an authentic sample. The ethereal solution was filtered, and phenylacetylene (0.08 moles per litre of the original toluene/nitrosyl chloride reaction mixture) was added to the filtrate, followed by an excess of an ethereal solution of triethylamine, which was added dropwise with stirring at room temperature. Chloro-oxime present was converted to nitrile oxide, which was trapped as an adduct with the phenyl acetylene. The mixture was evaporated to dryness. The residue was washed with water, redissolved in dichloromethane and dried, and the solvent was removed under vacuum to give 3,5-diphenylisoxazole (0.0425 moles per litre; melting point 140°C–143°C).

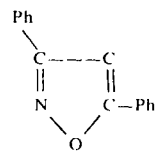

EXAMPLE 8

Photochloronitrosation of di-para-Tolyl Ether

Using the procedure of Example 7, a solution of di-p-tolyl ether (250 parts by weight) in benzene (200 parts by volume) was saturated with nitrosyl chloride and irradiated to give a mixture containing p-tolyl-4'-(1-chloroaldoximino) phenyl ether,

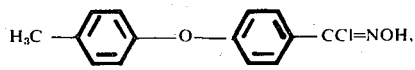

and unreacted starting material. After removal of the benzene and unreacted nitrosyl chloride by rotary evaporation at room temperature, the product mixture was concentrated by fractional crystallisation to given a mixture containing 33% by weight of the monochloroxime.

EXAMPLE 9

Photochloronitrosation of di-para-Tolyl Sulphone

Using the procedure of Example 7, a solution of di-p-tolyl sulphone (98 parts by weight) in chloroform (260 parts by volume), to which had been added NOCl (60 parts by volume (liquid) was irradiated while a slow stream of anhydrous hydrogen chloride was passed through the mixture. After removal of the solvent and unreacted nitrosyl chloride by rotary evaporation at room temperature, the product was concentrated by addition of cold ether and removal of undissolved starting material to give, after evaporation of the etheral filtrate, a product mixture which was analysed by nuclear magnetic resonance spectroscopy as 50 mole % unreacted starting material; 25 mole % p-tolyl-4'-chloromethylphenyl sulphone,

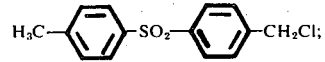

and 25 mole % p-tolyl-4'-(1-chloro-oximino) phenyl sulphone

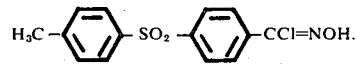

EXAMPLE 10

Photochloronitrosation of 1,3-dimethyl-5-tert butyl benzene

Using the procedure of Example 7, a saturated solution of nitrosyl chloride in 1,3-dimethyl-5-butylbenzene was irradiated. A slow stream of anhydrous hydrogen chloride was passed through the mixture during the reaction period. After irradiation the mixture was concentrated by prolonged high-vacuum rotary evaporation at 30°C to give a concentrate containing 25% by weight of 1-methyl-3-t-butyl-5-(1-chloro-oximino) benzene

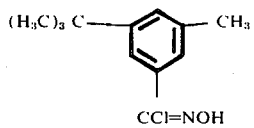

The product was identified by thermal dehydrochlorination to isocyanate, as described below, and by dehydrochlorination with base at room temperature to give the corresponding nitrile oxide.

EXAMPLE 11

Photochloronitrosation of p-Xylene

Using the procedure of Example 7, a saturated solution of nitrosyl chloride in p-xylene was irradiated to give a precipitate of p-tolualdoxime hydrochloride, and a p-xylene solution of 1-methyl-4 (1-chloro-oximino)benzene.

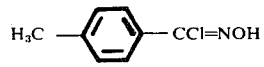

Treatment of the chloro-oxime solution with base converted it to p-toluonitrile oxide, which was identified by infra-red spectroscopy.

EXAMPLE 12

Photochloronitrosation of p-Tolualdoxime (Note. In this Example, quantities are expressed as moles per litre of the original solution of p-tolualdoxime in chloroform). p-Tolualdoxime was dissolved in chloroform (0.55 moles per litre) and the solution was placed in a glass annular reactor, the inner wall of which was cooled with circulating ice water. The reactor was fitted with a gas inlet and outlet. Outlet gases passed through a solid carbon dioxide condensor and a tube packed with silica gel to a scrubber for hydrogen chloride.

Nitrosyl chloride (1.1 moles per litre) was added to the solution. An initial chlorination reaction took place. When this reaction was complete, as evidenced by the disappearance of the initial green coloration and cessation of gas evolution, a further 1.65 moles of nitrosyl chloride were added per litre.

A slow stream of anhydrous hydrogen chloride was passed through the reactor, which was illuminated with two 500 watt "Photoflood" lamps. Reaction was continued until the mixture changed colour from a red-brown to a pale yellow. The solvent was removed by evaporation at room temperature, and the crude product was dehydrochlorinated by heating a solution in dichlorobenzene, as described below. The isocyanates so produced were identified as the corresponding monomethyl- and dimethyl urethanes by addition of methanol.

Removal of the solvent by evaporation gave a mixture containing

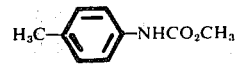

melting point 95.5°–97.5°C
and

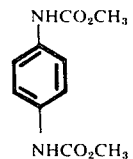

melting point 213°–214°C

EXAMPLE 13 p-Phenylene di-isocyanate from p-Xylene

The procedure of Example 12 was repeated using p-xylene as starting material.

The products were a mixture of p-tolyl isocyanate and 1,4-di-isocyanatobenzene (p-phenylene di-isocyanate). The isocyanates were identified by addition of methanol to convert them to the corresponding methyl urethanes, which were separated by fractional crystallisation from methanol.

EXAMPLE 14

Photochloronitrosation of benzyl chloride, with conversion of the chloro-oxime to nitrile oxide Using the procedure of Example 7, a saturated solution of nitrosyl chloride in benzyl chloride was irradiated while a slow stream of anhydrous hydrogen chloride was passed through the reaction mixture.

The reaction product was shaken with excess 10% sodium carbonate solution and set aside for 16 hours at room temperature. The solution was concentrated by vacuum rotary evaporation to give a liquid product which was shown by infra-red spectroscopy to be a mixture of benzonitrile oxide and its dimer, 3,4-diphenyl furoxan

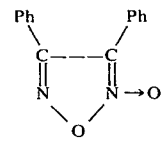

On allowing the mixture to stand at room temperature for a further period, the nitrile oxide dimerised to give crystals of 3,4-diphenyl furoxan, which was identified by mixed melting point and comparison of its infrared spectrum with that of authentic material.

EXAMPLES 15–17

Production of Isocyanates

General Procedure

The apparatus consisted of a pear-shaped flask (50 parts by volume) equipped with a condensor down which passed a thin tube carrying a nitrogen purge. From the condensor, a gas outlet led to scrubbing bottles containing 0.1 N aqueous sodium hydroxide and phenol-phthalein indicator. The outlet gas stream could be passed through individual scrubbing bottles in turn, thus enabling the hydrogen chloride produced during the dehydrochlorination reaction to be assayed at intervals without interrupting the reaction.

The reaction vessel was charged with a solvent (25 parts by volume) and the hydroxamic acid chloride (0.2 moles per litre in the case of a mono hydroxamic acid chloride compound or 0.08 moles per litre in the case of a bis(hydroxamic acid chloride compound). A slow stream of nitrogen was passed through the solution and the reaction vessel was heated to reflux temperature by means of a heating bath. At intervals, the outlet nitrogen stream was diverted to a fresh scrubbing bottle, and the sodium hydroxide in the previous scrubbing bottle estimated by back titration with acid. In this way, hydrogen chloride production could be measured as a function of time.

On completion of reaction, the contents of the reaction vessel were analyzed for isocyanates by infra-red spectroscopy, isocyanate absorption occurring in the 2290 cm$^{-1}$ region. The correctness of this assignment was confirmed by the disappearance of absorption at this frequency on addition of methanol, which would convert an isocyanate to a methyl urethane.

EXAMPLE 15

Phenyl isocyanate

Using the general procedure described above benzaldoxime chloride (benzohydroxamic acid chloride), Ph CCl=NOH, was converted to phenyl isocyanate. Hydrogen chloride was evolved quantitatively.

The identity of the prodct was confirmed in two ways.

Benzaldoxime chloride was heated in dichlorobenzene for 2 hours. The mixture was then cooled and methanol (10 parts by volume) was added. The mixture was allowed to stand for 1 hour and was then heated to 60°C for another hour. The solvent was removed by evaporation at 0.1mm Hg pressure and the solid residue was recrystallised from methanol. Mass spectroscopy, thin-layer chromatography and mixed melting point with authentic material confirmed the product as the methyl urethane of phenyl isocyanate.

The thermolysis reaction was repeated. The contents of the reaction vessel were diluted with carbon tetrachloride and analyzed by quantitative infra-red spectroscopy. Using dichlorobenzene as solvent, phenyl isocyanate was produced from benzaldoxime chloride in 80%, yield.

EXAMPLE 16 p-Phenylene di-isocyanate

The procedure of Example 5 was repeated using terephthaldoxime dichloride (1,4-bis(1-chloro-oximino) benzene; benzene-1,4-bis(hydroxamic acid chloride)

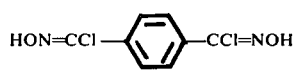

Using dichlorobenzene as solvent, the yield of p-phenylene di-isocyanate was 85%.

EXAMPLE 17

3-methyl-5-tert-butylphenyl isocyanate

A 25% (by weight) solution of 1-methyl-3-t-butyl-5-(1-chloro-oximino) benzene

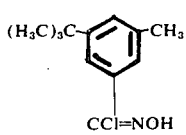

in 1,3-dimethyl-5-t-butyl-benzene was heated to 180°C using the general procedure described above.

Reaction was continued until evolution of hydrogen chloride had ceased. The reaction mixture was fractionated under reduced pressure to give a fraction rich in 3-methyl-5-t-butyl-phenyl isocyanate

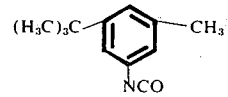

The identity of the product was confirmed addition of aniline to give the corresponding phenyl urea

melting point 220°C
Elemental Analysis:
Experimental: C 73.58%; H 7.50%; N 9.85%
Required: C 76.60%: H 7.80%; N 9.93%

A number of dehydrochlorinations of various hydroxamic acid chloride compounds were performed using the general procedure described above. Hydrogen chloride evolution was plotted as a function of time, starting from the time when the reaction mixture reached reflux temperature.

The results are shown in the accompanying drawings, as follows: FIG. 1 shows the dehydrochlorination of terephthaldoxime di-chloride in refluxing o-dichlorobenzene (curve A; boiling point 180°C) and refluxing chlorobenzene (curve B; boiling point 132°C).

FIG. 3 shows the dehydrochlorination of terephthaldoxime dichloride in refluxing chlorobenzene (curve (i); boiling point 132°C) and refluxing m-xylene (curve (ii), boiling point 139°C).

FIG. 4 shows the dehydrochlorination of terephthaldoxime dichloride in methoxybenzene (anisole) (curve (i); boiling point 155°C) and isopropylbenzene (cumene) (curve (ii); boiling point 152°C).

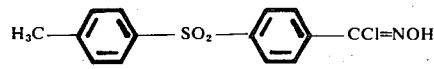

in o-dichlorobenzene

Figure 6:
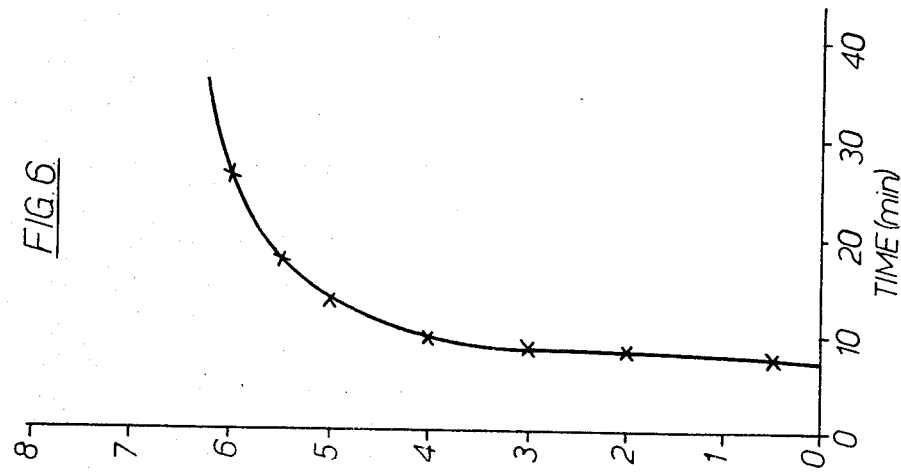

FIG. 6 shows the dehydrochlorination of 1-methyl-3-t-butyl-5-(1-chloro-oximino) benzene in o-dichlorobenzene.

Figure 5:
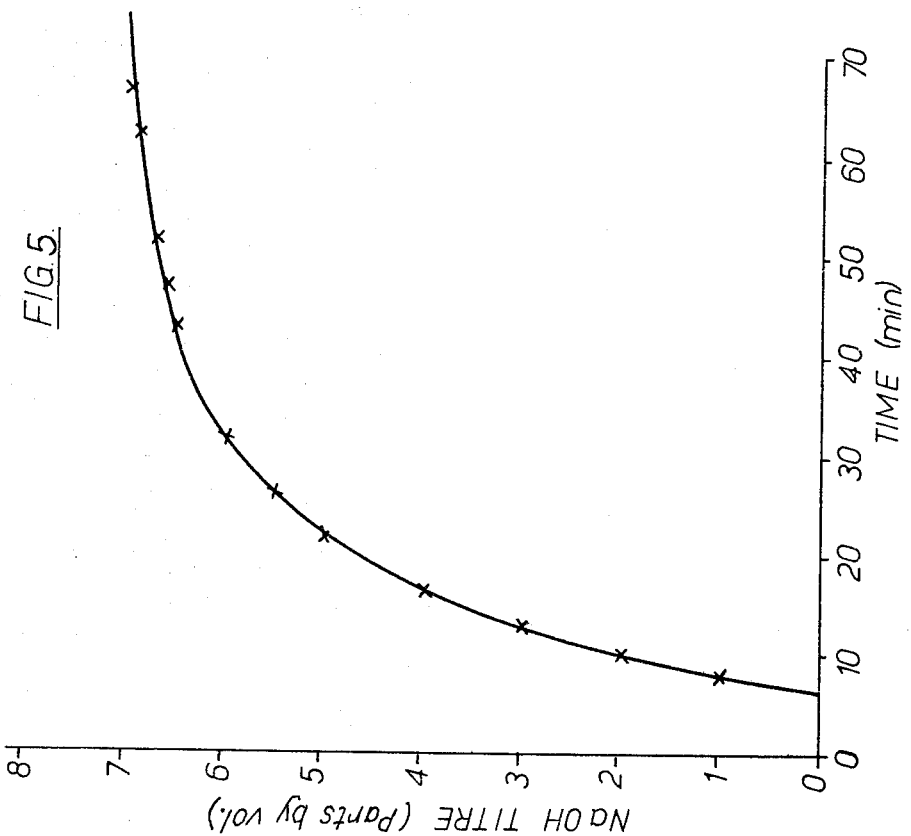
FIG. 5 shows the dehydrochlorination of p-tolyl-4'-(1-chlorooximino) phenyl sulphone

(Notes i. The theoretical hydrogen chloride titre, based on chloride analysis of the starting material, is shown in FIGS. 1 and 2 by a dashed line.

ii. In FIGS. 5 and 6, time was measured from the start of heating, and there is about a 7 min. pause before the reaction mixutre reached reflux temperature).

Figure 1:
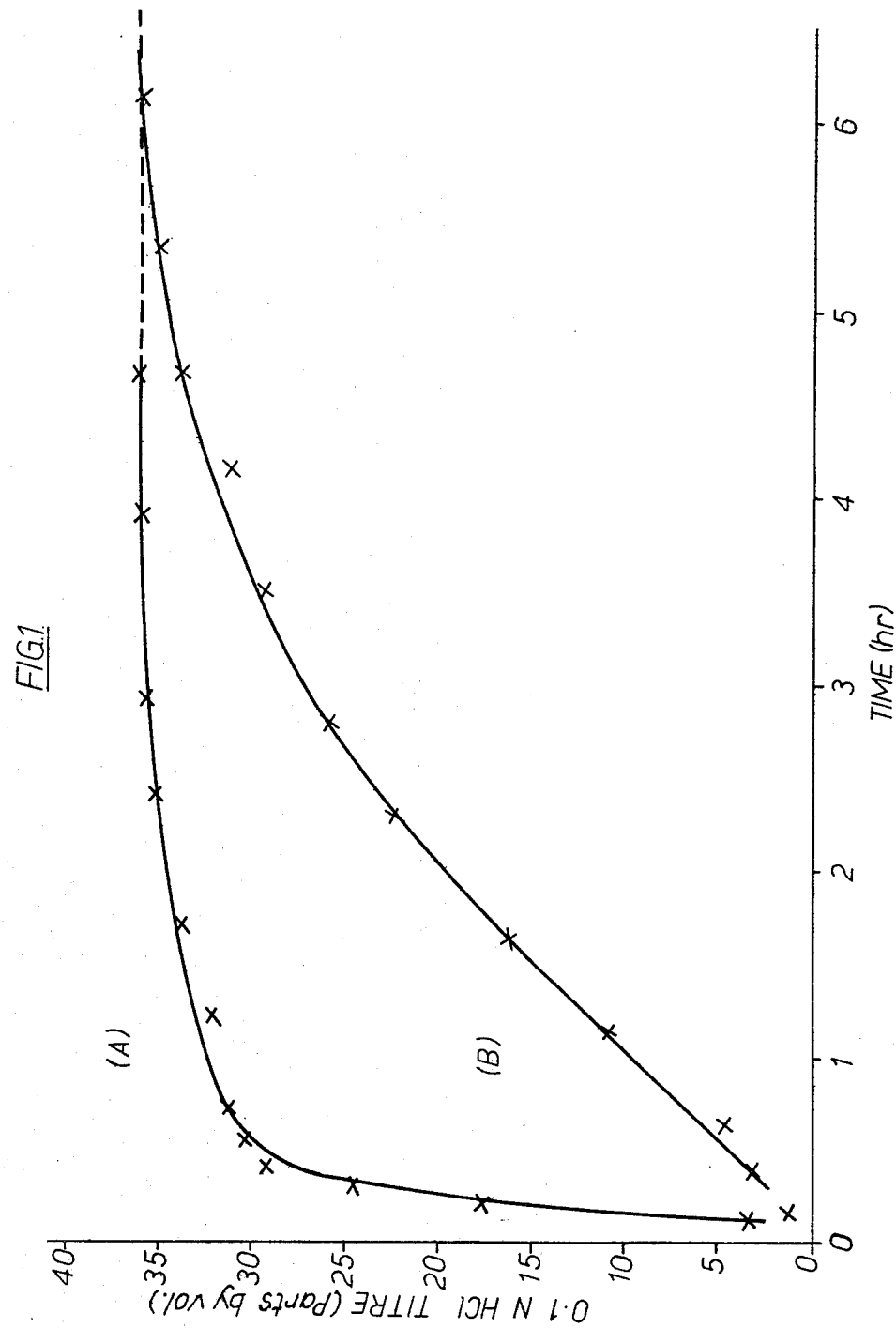
Figure 2:
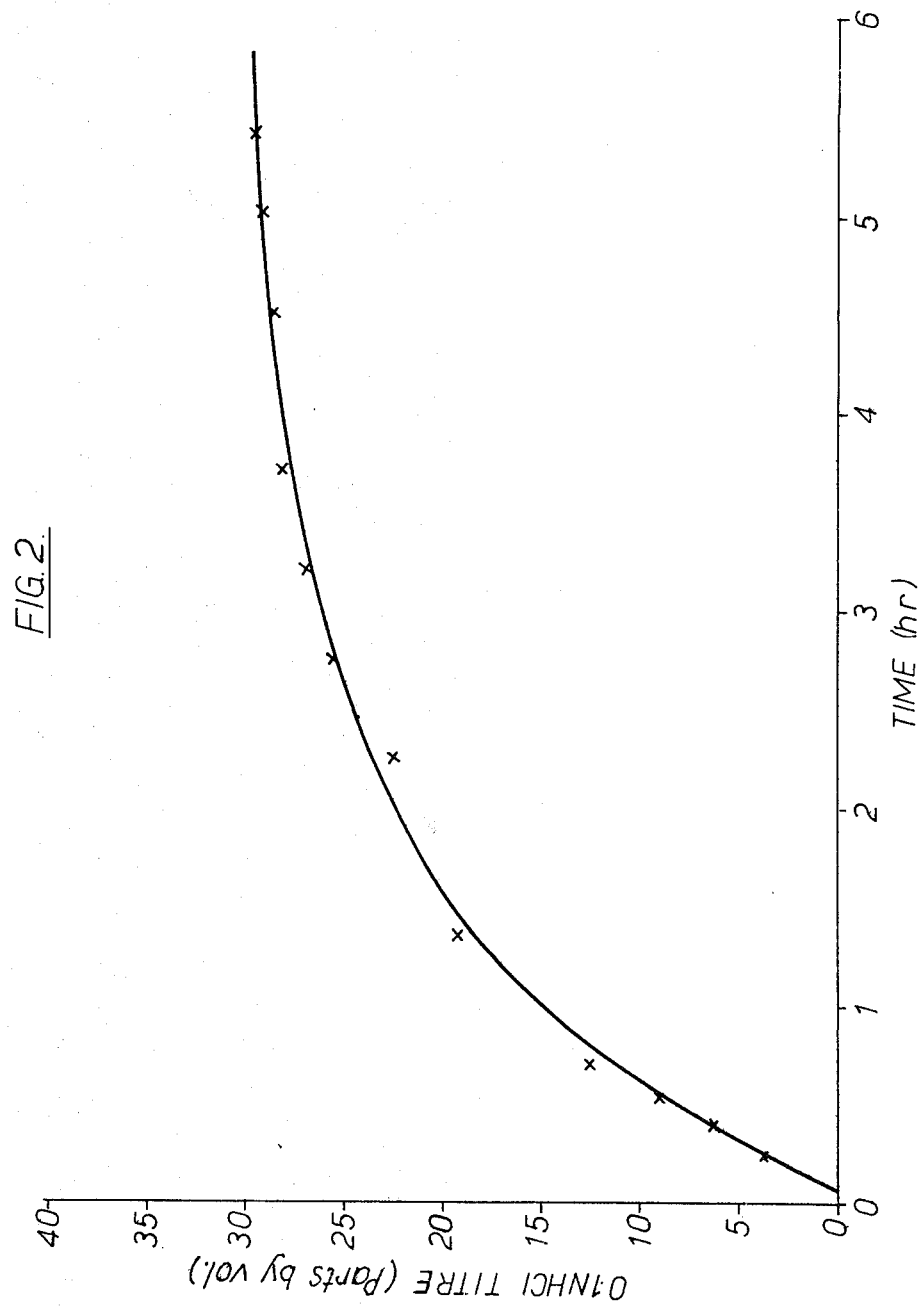
FIG. 2 shows the dehydrochlorination of benzohydroxamic acid chloride in refluxing chlorobenzene.

The effect of temperature, using similar solvents, is shown in FIG. 1, where the reaction is faster in dichlorobenzene than in monechlorobenzene.

The advantageous effect of increasing the solvent polarity is apparent from FIGS. 3 and 4.

What we claim is:

1. In a process for the production of aromatic isocyanates by the thermal decomposition of an aromatic hydroxamic acid halide, the improvement comprising the employment as starting material a solution in an appropriate solvent of an aromatic compound selected from aromatic hydrocarbons and compounds which contain at least two benzene rings linked together to form an ether, thioether, sulphone, phosphate or phosphite and containing at least two hydroxamic acid chloride groups attached to the same or different aromatic rings.

2. The process of claim 1 in which the starting material is a bis hydroxamic acid chloride.

3. The process of claim 1 in which the starting material is in solution in a polar aromatic solvent.

4. The process of claim 3 in which the solvent is o-dichlorobenzene.

5. The process of claim 1 in which the starting material is an aromatic hydrocarbon or ether.

6. A process for the production of aromatic isocyanates which comprises the steps of mixing a nitrosyl halide with an aromatic compound selected from aromatic hydrocarbons and compounds which contain at least two benzene rings linked together to form an ether, thio-ether, sulphone, phosphate or phosphite and containing one or more methyl or chloromethyl groups attached to an aromatic ring and irradiating the mixture with visible or ultraviolet light of a wave length capable of being absorbed by both reactants to form an aromatic compound containing one or more hydroxamic acid chloride groups attached to an aromatic ring, and then dehydrohalogenating the hydroxamic acid chloride by thermal decomposition at a temperature in the range of 100° to 250°C.

7. The process of claim 6 in which the reaction between the nitrosyl halide and the aromatic compound is performed in the presence of a Lewis acid.

8. The process of claim 7 in which the Lewis acid is anhydrous hydrogen chloride.

9. The process of claim 6 in which the nitrosyl halide is reacted with the aromatic compound in the presence of a stoichiometric excess of nitrosyl halide at reflux temperature.

10. The process of claim 6 in which the nitrosyl halide is reacted with an aromatic compound containing at least one halomethyl group attached to an aromatic ring.

11. The process of claim 10 in which the nitrosyl halide is reacted with an aromatic compound containing at least one chloromethyl group attached to an aromatic ring.

12. The process of claim 6 in which the nitrosyl halide is reacted with an aromatic compound bearing two substituents on the same or different aromatic rings, the substituents being independently selected from the group consisting of methyl and chloromethyl groups.

13. The process of claim 6 in which the nitrosyl halide is nitrosyl chloride.

14. The process of claim 6 in which the aromatic compound contains at least two benzene rings.

15. The process of claim 14 in which the benzene rings are joined one to another by a direct link, or a divalent or polyvalent atom or group.

16. The process of claim 14 in which the aromatic compound is selected from the group consisting of methyl diphenyl ether, dimethyldiphenyl ether, methylbiphenyl, dimethylbiphenyl, methyldiphenyl-methane, dimethyldiphenylmethane, di-tolyl sulphone, tris-tolyl phosphate, and the corresponding chloromethyl compounds.

17. The process of claim 6 in which the aromatic compound is selected from the group consisting of toluene, xylene, benzyl chloride, di-p-tolyl ether, di-p-tolyl sulphone and 1,3-dimethyl-5-t-butylbenzene 18. The process of claim 6 in which a solution of the hydroxamic acid halide compound is heated.

19. The process of claim 18 in which the hydroxamic acid halide compound is in solution in a polar aromatic solvent.

20. The process of claim 19 in which the solvent is a halobenzene.

21. The process of claim 20 in which the solvent is o-dichlorobenzene.

* * * * *